US011829792B1

(12) United States Patent
Chandrashekar

(10) Patent No.: US 11,829,792 B1
(45) Date of Patent: Nov. 28, 2023

(54) IN-PLACE LIVE MIGRATION OF COMPUTE INSTANCES FOR EFFICIENT HOST DOMAIN PATCHING

(71) Applicant: Amazon Technologies, Inc., Seattle, WA (US)

(72) Inventor: Samartha Chandrashekar, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 170 days.

(21) Appl. No.: 17/027,402

(22) Filed: Sep. 21, 2020

(51) Int. Cl.
*G06F 9/455* (2018.01)
*G06F 9/50* (2006.01)
*G06F 12/0868* (2016.01)

(52) U.S. Cl.
CPC ........ *G06F 9/45558* (2013.01); *G06F 9/5077* (2013.01); *G06F 12/0868* (2013.01); *G06F 2009/4557* (2013.01); *G06F 2009/45562* (2013.01); *G06F 2009/45583* (2013.01); *G06F 2009/45595* (2013.01)

(58) Field of Classification Search
CPC .................................................. G06F 9/45558
USPC ............................................................ 718/1
See application file for complete search history.

(56) References Cited

U.S. PATENT DOCUMENTS

| | | | | |
|---|---|---|---|---|
| 9,584,436 | B1* | 2/2017 | Rodgers | G06F 16/9566 |
| 2011/0023030 | A1* | 1/2011 | Lim | G06F 9/5077 |
| | | | | 718/1 |
| 2012/0117555 | A1* | 5/2012 | Banerjee | G06F 8/65 |
| | | | | 717/168 |
| 2012/0254865 | A1* | 10/2012 | Saeki | G06F 8/656 |
| | | | | 718/1 |
| 2012/0291021 | A1* | 11/2012 | Banerjee | G06F 9/45558 |
| | | | | 717/173 |
| 2014/0068613 | A1* | 3/2014 | Iriguchi | G06F 9/5083 |
| | | | | 718/1 |
| 2015/0324217 | A1* | 11/2015 | Shilmover | G06F 9/45558 |
| | | | | 718/1 |
| 2017/0315838 | A1* | 11/2017 | Nidugala | H04L 43/0817 |
| 2018/0203715 | A1* | 7/2018 | Granado | G06F 9/45558 |
| 2018/0225455 | A1 | 8/2018 | Nersisyan et al. | |
| 2019/0065228 | A1* | 2/2019 | Tsirkin | G06F 9/45558 |
| 2020/0387410 | A1* | 12/2020 | Schimke | G06F 9/541 |
| 2021/0034407 | A1* | 2/2021 | Tian | G06F 9/505 |
| 2021/0149706 | A1* | 5/2021 | Liu | G06F 9/45558 |
| 2021/0397715 | A1* | 12/2021 | Duval | G06F 21/602 |

* cited by examiner

*Primary Examiner* — Mehran Kamran
(74) *Attorney, Agent, or Firm* — NICHOLSON DE VOS WEBSTER & ELLIOTT LLP

(57) ABSTRACT

Techniques for in-place live migration of guest domain compute instances are described. A secondary host domain, which may be a patched version of an initial host domain, is launched on a computing device in a candidate host domain role or as a guest domain with escalated privileges. Existing guest domains are live migrated within the computing device to utilize the secondary host domain while the initial host domain continues to serve guest domains that have not yet been migrated. When all guest domains have been migrated, the initial host domain may be terminated, resulting in a patched computing device without network-based failures or noticeable service degradation for the guest domains, and while allowing existing guest domain workflows and network connections to continue unaffected.

19 Claims, 9 Drawing Sheets

IN-PLACE LIVE MIGRATION OF COMPUTE INSTANCES FOR EFFICIENT HOST DOMAIN PATCHING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Figure 1:
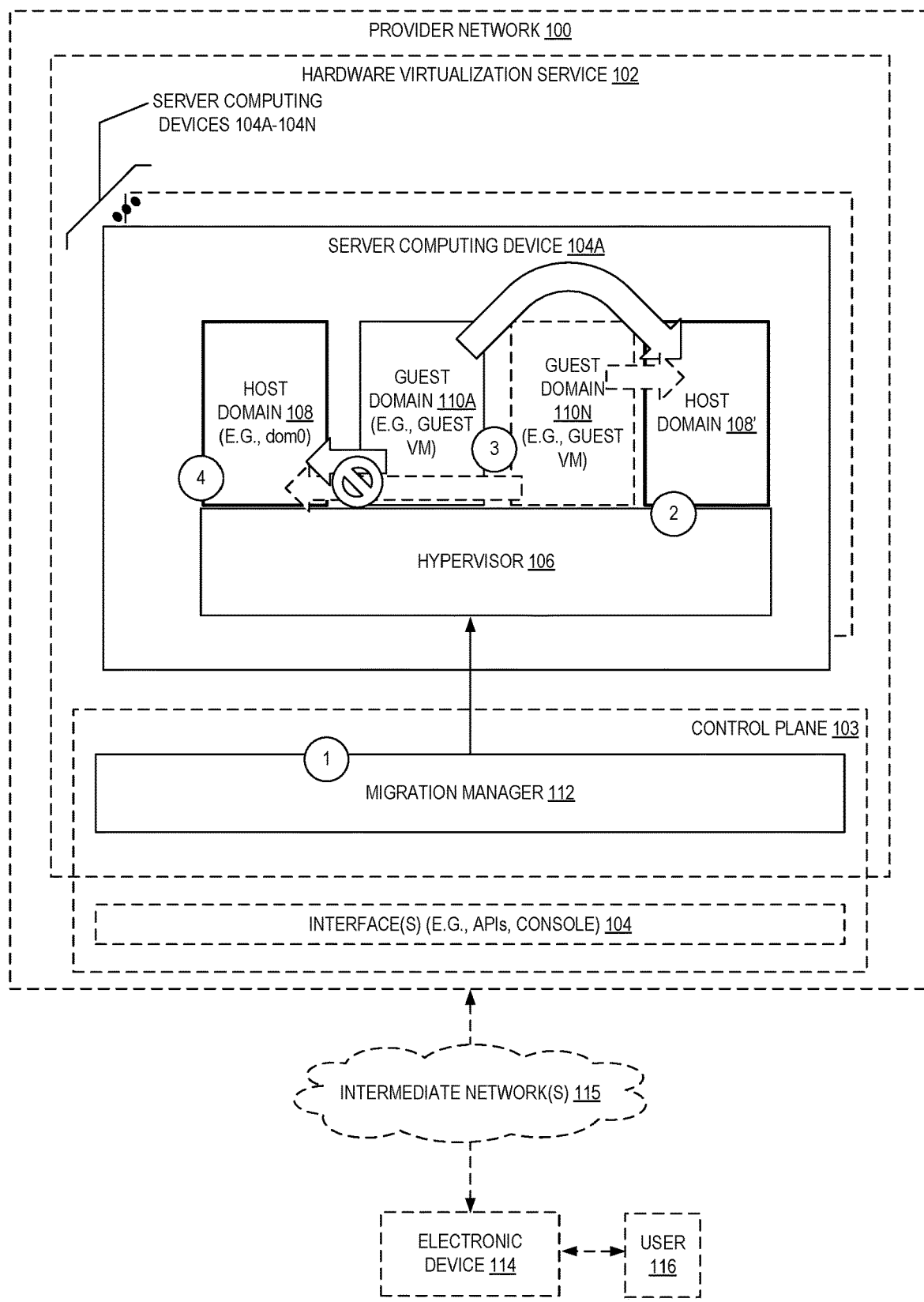
FIG. 1 is a diagram illustrating an environment for in-place live migration of compute instances for efficient host domain patching according to some embodiments.

The present disclosure relates to methods, apparatus, systems, and non-transitory computer-readable storage media for in-place live migration of compute instances for efficient host domain patching. According to some embodiments, compute instances (also referred to herein as guest domains, which may be a virtual machine) can be "migrated" to a destination location on a same device, which can allow for an underlying host domain (e.g., a "dom0" domain) to be patched with minimal or no apparent impact to the observed performance of these compute instances. In some embodiments, a patched host domain can be launched on a host server device—alongside an existing, previous host domain—and compute instances can be migrated in waves to use the patched host domain using "live migration" techniques. Alternatively, in some embodiments, a patched host domain can be launched on a host server device and existing compute instances can be updated to use a new host domain by, for example, updating state of an underlying hypervisor to shift communications of the guest domains through the patched host domain.

As is known to those of skill in the art, a compute instance or virtual machine (VM) is a separate and independent instance of an operating system (and typically application software) that runs on a host physical server device, perhaps along with one or more other compute instances that all share use of the underlying host's physical computing resources such as the processor, physical memory, network interfaces, etc. One system architecture for implementing compute instances involves running a virtual machine monitor (VMM) or hypervisor on the host device which supports the one or more compute instances by providing shared access to the underlying hardware. In some configurations, such as in the Xen Project hypervisor architecture, the hypervisor is a relatively lean software layer that runs directly on the hardware and is responsible for managing the central processing unit (CPY), memory, and interrupts. In this context, the hypervisor may be the first program running after the bootloader exits, and itself has no knowledge of input/output (I/O) functions such as networking and storage. Instead, the hypervisor works in collaboration with a special virtual machine called a host domain (commonly referred to as a "Domain 0", "dom0", or "control domain")

to support the guest domains (i.e., the guest virtual machines). This host domain has special privileges, such as the capability to access the hardware directly, and may provide access to the system's I/O functions to the other guest domain virtual machines. The host domain may thus be comparatively larger than the underlying hypervisor, and include code for providing system services, native device drivers, virtual device drivers, and/or creating, destroying, and configuring the guest domains.

As host domains include a relatively large amount of code for various purposes, it is typical that this code is improved or patched at a relatively frequent interval, especially compared to the underlying "thin" hypervisor that is comparatively stable and static. Accordingly, to provide the most stable and secure computing environment, operators of networks making use of virtualization need to keep their host domains up to date with the latest versions as fast as possible. As updating these host domains requires a service interruption to the guest domains that they support, one technique for patching the host domains includes migrating the guest domains to other physical computing devices, thus removing the host domain from active use and allowing for it to be patched, upgraded, etc.

In some modern computing environments such as cloud provider networks, various migration techniques are used to move compute instances from one host computing device to another. Thus, the movement of compute instances between host devices may take one of several forms of migration, where one or multiple of these forms may be available for use in a deployment. Generally, a "migration" refers to moving virtual machine instances (and/or other associated resources) between hosts in a cloud computing network or even between hosts outside of the cloud computing network and hosts within the cloud network.

There are different types of migration of compute instances, including live migration and reboot migration. During a reboot migration, a user with a virtual machine instance will experience an outage and an effective power cycle of their instance. For example, a control plane service of a cloud provider network can coordinate a reboot migration workflow that involves tearing down the current execution guest domain on the original host and subsequently creating a new execution guest domain for the virtual machine instance on the new host. The instance is rebooted by being shut down on the original host and booted up again on the new host. Live migration, in contrast, may refer to the process of moving a running virtual machine instance (or grouping thereof) between different physical machines without significantly disrupting the availability of the virtual machine(s) (e.g., the downtime of the virtual machine is not noticeable by the end user or to clients interacting with the virtual machine, or only noticeable as an extremely brief disruption of service or degraded service).

To execute a live migration workflow when moving an instance from one host to a different host, the control plane may create a new "inactive" guest domain associated with the instance, while the original guest domain for the instance continues to run as the "active" domain. Memory (including in-memory state of running applications), storage, and state associated with network connectivity of the virtual machine are transferred from the original host with the active domain to the destination host (or location) with the inactive domain. The source virtual machine may be briefly paused to prevent state changes while transferring memory contents (e.g., a delta set of changes to memory made between a full memory copy and the pausing of the virtual machine, which may be identified via a data structure tracking memory pages that have become "dirty" since the original memory transfer) to the destination host location. The control plane can then transition the inactive guest domain to become the active guest domain and demote the original active guest domain to become the inactive guest domain (sometimes referred to as a "flip"), after which the inactive guest domain can be discarded.

During live migration, managing the critical phase—the time when the virtual machine instance is unavailable—is crucial and should be kept as short as possible. In some migration settings this can be especially challenging, as resources may be moved between hosts in geographically separate locations which may be connected over one or multiple intermediate networks, which may have different or changing environmental characteristics that can affect the transmission of data needed in the critical phase, such as latencies between the locations, limited or changing network bandwidth availabilities, and/or host usage amounts. Thus, in some cases the delay during the critical phase may be significant, leading to a longer than expected (i.e., noticeable) "outage" which may even lead to a halt of the migration where the source virtual machine may be unpaused (and resume operation as the primary virtual machine) and the entire migration halted or paused in order to not significantly affect the users' virtual machines. As a result, it may be difficult to "clear" a host computing device of guest domain virtual machines to allow for the host domains to be patched, leaving unpatched or otherwise out-of-date, insecure host domains in operation until the guest domains are shut down or finally migrated elsewhere.

Embodiments disclosed herein can address such issues and others via "in-place" migrations of compute instances. In some embodiments, a guest domain virtual machine is migrated in such a manner that it effectively never leaves the source host, while still allowing for patching of the host. Accordingly, the likelihood of success for being able to perform migration to patch a host is significantly higher while also eliminating the need for a spare physical host (to host migrated instances) or the need to move this data over a network. In some embodiments, an in-place migration involves launching a "new" host domain (e.g., a candidate dom0') on a host device, where an old version of the host domain (dom0) may continue to run until all instances are utilizing the patched version (dom0'). As existing compute instances will not recognize the candidate dom0' as the parent partition, they can be "migrated" to use the new dom0' by launching corresponding compute instances on the same host that use the new dom0' and performing live migrations in waves, e.g., one-by-one (or in larger groups), until the old dom0 is no longer utilized and can be terminated. Alternatively, in some embodiments the hypervisor may "flip" the compute instances to using the new dom0' by updating a variety of state elements to cause the compute instances to immediately begin using the new dom0', and at this point the old dom0 is no longer utilized and can be terminated. Both of these scenarios are referred to herein as "intra-host migration." Thus, due to the need to update the host domain with much higher frequency compared to the need to update the hypervisor, a fleet of such host server devices can be updated much more rapidly and easily, without the need for excess host capacity or significant network bandwidth needed for other inter-host live migrations.

FIG. 1 is a diagram illustrating an environment for in-place live migration of compute instances according to some embodiments. In FIG. 1, one or more guest domains 110A-110N executing on a server computing device 104A originally using a host domain 108 (e.g., a dom0) are migrated to use a host domain 108' (or dom0'). This process (or similar processes disclosed herein) may be performed with one or multiple server computing devices 104A-104N, which may optionally serve as part of a fleet of such devices that host compute instances as part of a hardware virtualization service 102 of a provider network 100. The migration may be initiated and/or orchestrated by a migration manager 112 component of a control plane 103 of the hardware virtualization service 102. The migration manager 112 may be implemented as a software component using one or multiple computing devices in one or multiple locations.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service 102 that can execute compute instances, a storage service that can store data objects, etc. The users 116 (or "customers") of provider networks 100 may utilize one or more user accounts that are associated with a customer account, though these terms may be used somewhat interchangeably depending upon the context of use. Users may interact with a provider network 100, e.g., via use of an electronic device 114 such as a mobile device, personal computer, or server device across one or more intermediate networks 115 (e.g., the internet) via one or more interface(s) 104, such as through use of application programming interface (API) calls, via a console implemented as a website or application, etc. An API refers to an interface and/or communication protocol between a client and a server, such that when the client makes a request in a predefined format, the client should receive a response in a specific format and/or cause the initiation of a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 104 may be part of, or serve as a front-end to, a control plane 103 of the provider network 100 that includes "backend" services supporting and enabling the services that may be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

A cloud provider network can include a physical network (e.g., sheet metal boxes, cables) referred to as the substrate. The cloud provider network can also include an overlay network of virtualized computing resources that run on the substrate. As such, network packets can be routed along a substrate network according to constructs in the overlay network (e.g., virtual private networks, virtual firewalls, and the like). A mapping service can coordinate the routing of these network packets. The mapping service can be a regional distributed look up service that maps the combination of overlay Internet Protocol (IP) address and network identifier to a substrate IP address so that the distributed substrate computing devices can look up where to send packets.

To illustrate, each physical host device can have an IP address in the substrate network. Hardware virtualization technology can enable multiple operating systems to run concurrently on a host computer, for example as VMs on the host. A hypervisor (also referred to as a virtual machine monitor (VMM) or more generally as an "instance manager") on a host allocates the host's hardware resources amongst various VMs on the host and monitors the execution of the VMs. In some embodiments, a hypervisor works together with a host domain to form a virtualization stack that can support the execution of guest domains. A host domain, also referred to as a "Dom0" or "Domain 0" in some contexts, is an initial domain started by the hypervisor on boot. The host domain is a privileged domain that starts first and manages the unprivileged guest domains (i.e., guest virtual machines), each of which may also be referred to as a "DomU" domain guest VM, or unprivileged domain. The host domain may provide the "host" operating system that can access hardware through a set of device drivers and may thus provide access to storage, network interfaces, etc., to the unprivileged domains.

Each VM may be provided with one or more IP addresses in the overlay network, and the hypervisor on a host may be aware of the IP addresses of the virtual machines on the host. The hypervisor (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., public IP addresses) to substrate IP addresses (e.g., private IP addresses), which can be accessed by various processes on the cloud provider network for routing packets between endpoints.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

A hardware virtualization service 102 (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor (e.g., hypervisor 106), which may run at least on an offload card of the server (e.g., a card connected via PCI or PCIe to the physical CPUs) and other components of the virtualization host may be used for some virtualization management components. Such an offload card of the host can include one or more CPUs that are not available to customer instances, but rather are dedicated to instance management tasks such as virtual machine management (e.g., via execution of a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical computing device for the client (e.g., from a pool of available physical compute instances and other resources), installing or launching required software (e.g., an operating system), and making the virtual compute instance available to the client for performing tasks specified by the client.

In some embodiments, the execution of compute instances is supported by a lightweight VMM. These VMMs enable the launch of lightweight micro-virtual machines (microVMs) in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped-down version of an OS kernel (e.g., having only the required OS components and their dependencies) to minimize boot time and memory footprint. In one implementation, each process of the lightweight VMM encapsulates one and only one microVM. The process can run the following threads: API, VMM, and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

Returning to FIG. 1, the migration manager 112 of a control plane 103 of the hardware virtualization service 102 may determine, at circle (1), that a need exists to migrate one or more guest domains 110A-110N, and may in some embodiments perform a feasibility analysis to determine whether a particular server computing device 104A is a candidate for an upgrade via in-place live migration.

For example, the migration manager 112 may determine that an updated version of some (e.g., a component or library) or all of the software running a host domain 108 in use in the hardware virtualization service 102 may exist, and thus may obtain updated code for the component/library/host domain (e.g., that may require compilation) and/or an entire updated executable or binary for the same. The determination may include determining that an updated version of a package or library has been released or checked in, e.g., via monitoring a website, database, update/package delivery system, receiving a notification from a user, etc.

A component of the migration manager 112 (described in further detail later herein) may then determine whether the server computing device 104A is a candidate for an upgrade via in-place live migration, which may include determining whether sufficient resource capacity exists on the server computing device 104A for the technique to be performed. As one example, the migration manager 112 may determine whether a sufficient quantity of one or more different computing resource types exists on the server computing device 104A (or could be made to exist, such as through a reconfiguration of one or more existing compute instances), such as a number or amount of processing cores, memory, persistent storage, networking, etc. In some embodiments, the migration manager 112 may determine whether the total available resources—across one or multiple resource type dimensions—meets the resource need for both an extra host domain 108' and a theoretical guest domain (requiring the largest amount of each resource type needed by any of the existing guest domains 110A-110N). If so, the live migration update can proceed.

The migration manager 112 may then, for example, obtain or generate a machine image for an updated host domain 108'. A machine image may include data and information used to launch a compute instance, such as one or more block-level snapshots or a template for the root volume of the instance (for example, an operating system, an application server, and applications). The machine image may also include configuration data specifying launch permissions that control which accounts can use the image to launch instances, and/or a block device mapping that specifies which, if any, volumes to attach to the instance when it is launched. The migration manager 112 may send this machine image to the server computing device 104A, or may store the machine image at another storage location (e.g., within a bucket or other object storage location provided by a storage service of the provider network) and send an identifier of the location (e.g., a URL, bucket/folder identifier, object identifier, etc.) of the machine image to the server computing device 104A, which may then retrieve the machine image using that identifier.

As part of transmitting the machine image and/or identifier thereof, the migration manager 112 in some embodiments sends a command, to the hypervisor 106 executing at the server computing device 104A, indicating that the hypervisor 106 is to perform a process to utilize a new host domain (e.g., based on the machine image) via migration. In response, the hypervisor 106 may at circle (2) launch a new host domain 108' based on the machine image, which may be launched as a typical guest domain role (e.g., having guest domain privileges) and thereafter modified to have host-domain role type privileges, or may be launched under a new "candidate" host domain role (set of privileges).

The hypervisor 106 may then, at circle (3), perform a live migration of one or more guest domains 110A-110N, possibly one-at-a-time, in small batches, or all substantially at once. In many environments where guest domain uptime is very important, it may be best to configure the hypervisor 106 to perform the live migration one guest domain at a time, such that upon the conclusion of each live migration the overall system (including the migrated guest domain) can be monitored and/or evaluated to ensure its stability, and then a next guest domain (or set thereof) can similarly be migrated. The migration may include, for a particular guest domain 110A, launching a corresponding guest domain (e.g., non-illustrated guest domain 110A') into a paused state but using the candidate/new host domain 108' for system operations, performing a state copy from the original particular guest domain 110A to the guest domain 110A' (e.g., performing a deep copy of its memory by copying all of its memory at a particular point in time), tracking memory changes (e.g., a bitmap tracking dirty memory pages) from the deep copy for a period of time until the source guest domain 110A is paused, and at that point transferring just the "dirty" memory from the source guest domain 110A to the target guest domain 110A', and un-pausing the target guest domain while pausing the source guest domain 110A. Such a process, in most environments, may complete in an amount of time less than a networking connection timeout (e.g., the TCP timeout), allowing any networking connections to continue unaffected, aside from a very minor delay in response during the migration. Thereafter, the source guest domain 110A—which was using the unpatched host domain 108—may be terminated while the target guest domain 110A' may use the patched host domain 108'.

As used herein, the corresponding guest domain launched as part of this process may be of a same size of the original guest domain across one or more computing resource dimensions, e.g., have the same allocation of hardware resource quantities involving processing amounts (e.g., virtual processor cores/types), memory amounts, persistent disk availability amounts, networking capabilities). However, in some embodiments the corresponding guest domain that is launched may have different resource quantities. For example, the corresponding guest domain that is launched may be of a same "shape" of virtual machine as the original guest domain in that it has amounts of various resources that differ in a same proportion; for example, the new guest domain could have double the resources than the original guest domain in some number of dimensions, such as 2 vCPUs instead of 1 vCPU, 2 GB of RAM instead of 1 GB of RAM, or the like.

At some point, one (or more) other guest domains may be similarly migrated, and when all have been migrated (and terminated) and the original unpatched host domain 108 is no longer in use, it may also be terminated at circle (4), ending the process.

Figure 2:
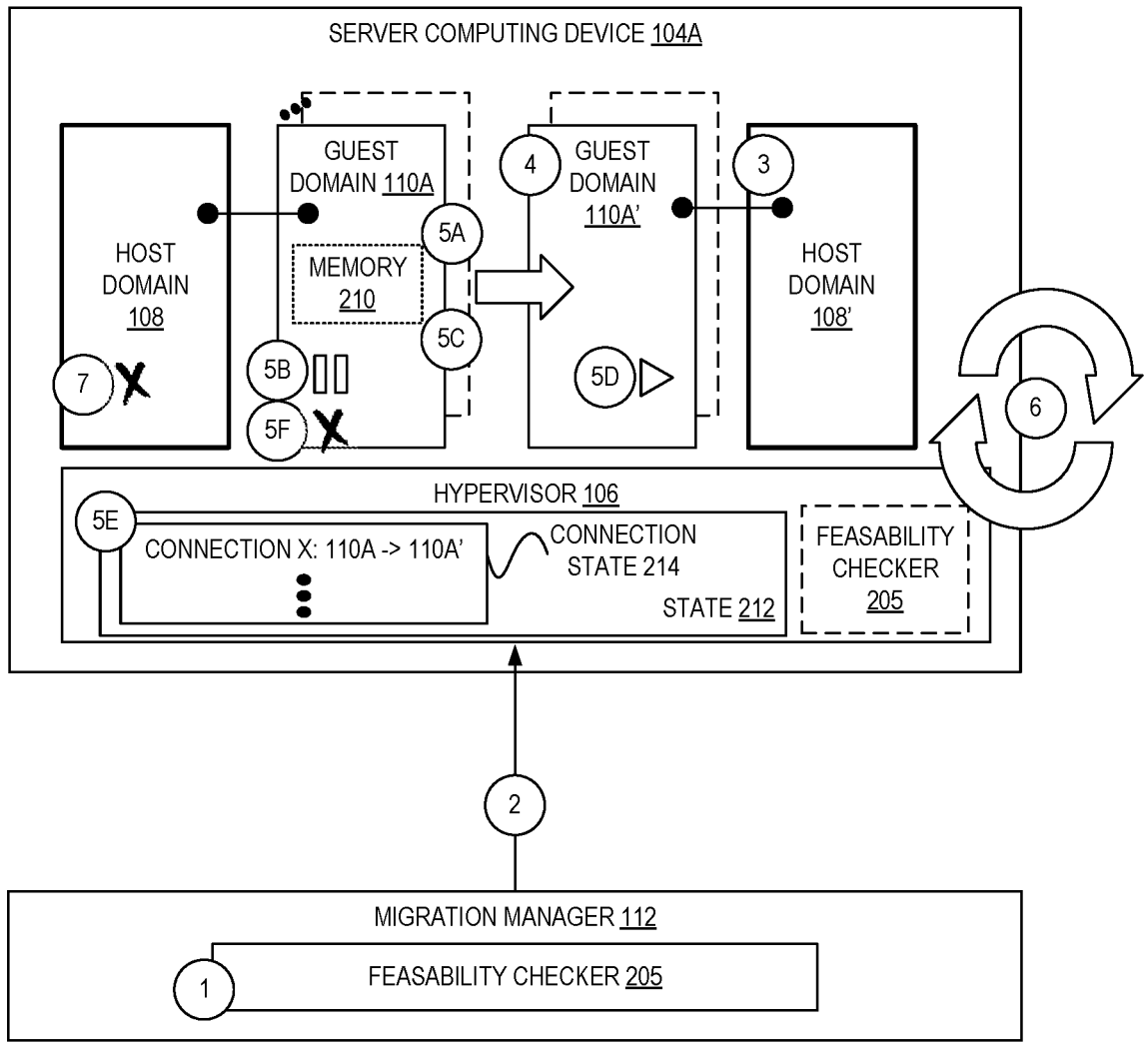
FIG. 2 is a diagram illustrating an environment for stepwise in-place live migration of compute instances for efficient host domain patching according to some embodiments.

For further detail, FIG. 2 is a diagram illustrating an environment for stepwise in-place live migration of compute instances for efficient host domain patching according to some embodiments. As shown in this example and introduced previously, the migration manager 112 in some embodiments utilizes a feasibility checker 205 software module to determine whether it is possible to perform a live migration type host domain patching/update, though in other embodiments the feasibility check may be performed by a feasibility checker 205 module executed by the server computing device 104A itself, as reflected by the dashed feasibility checker 205 shown within the server computing device 104A.

Figure 3:
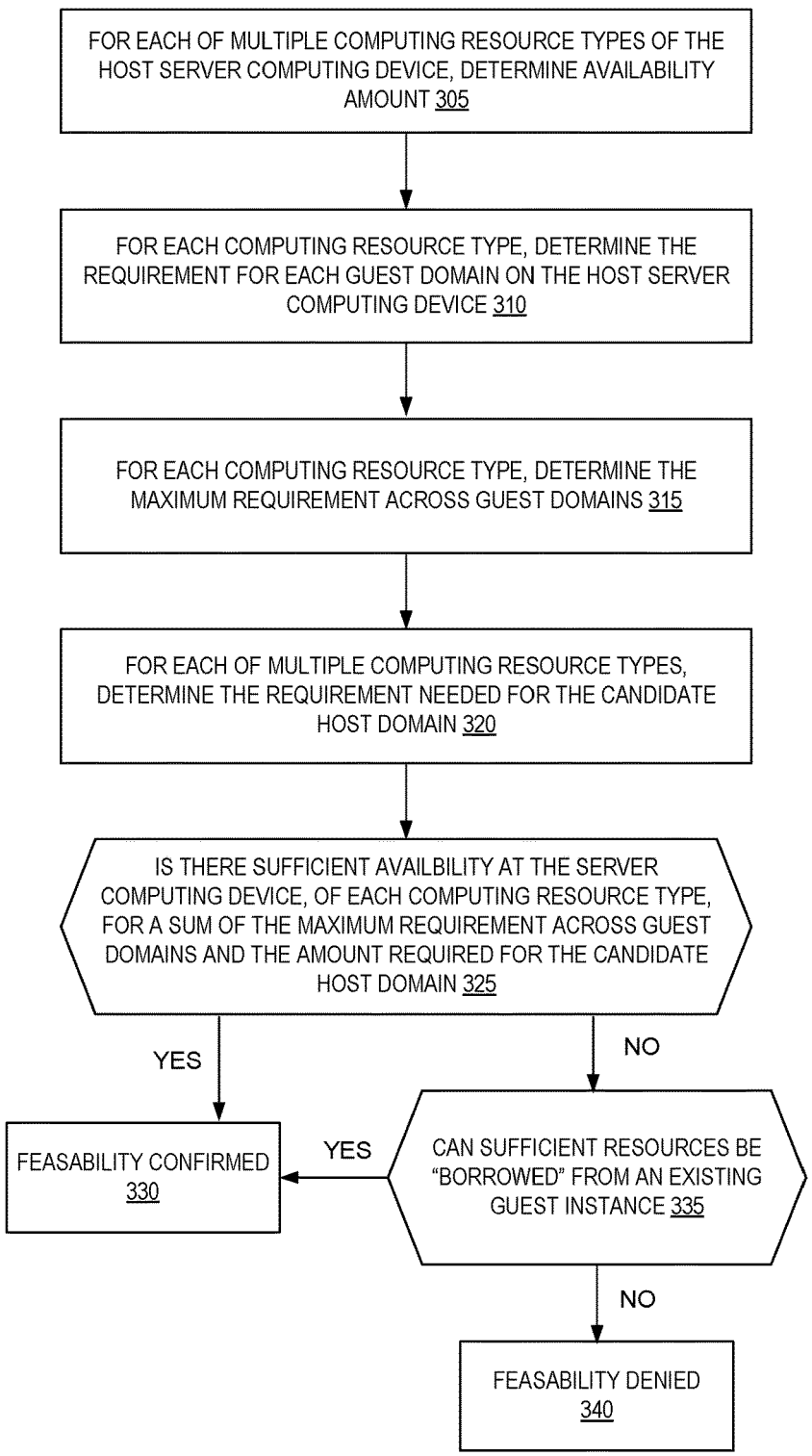
FIG. 3 is a diagram illustrating exemplary feasibility checking operations for stepwise in-place live migration of compute instances for efficient host domain patching according to some embodiments.

The feasibility checker 205 may perform a set of feasibility checks to ensure that the server computing device 104A is indeed able to perform an intra-host live migration as described herein. For example, FIG. 3 is a diagram illustrating exemplary feasibility checking operations 300 for stepwise in-place live migration of compute instances for efficient host domain patching according to some embodiments. Some or all of the operations 300 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 300 are performed by the feasibility checker 205 of the other figures, which may be executed as part of a migration manager 112 or on a server computing device 104A seeking to migrate instances, for example.

The operations 300 include, at block 305, determining an availability amount for each of multiple computing resource types of the host server computing device. For example, an amount of available virtual or physical processing cores, memory, networking capability, storage, etc., can be determined. The determination may be made on the host by analyzing known available resources (e.g., according to the hypervisor, by querying an underlying O/S, etc.) and/or analyzing known used/reserved resources and comparing the usage to the total amount of resources. Alternatively, the determination may be made remote from the host, e.g., in the migration manager 112 by querying the host device for resource availability amounts, by querying a hardware virtualization service data store to determine what compute instance "slots" are available on the host (or, what "slots" are currently in use) and using that information along with knowledge of the overall host availability to determine what remains available.

At block 310, the operations 300 include determining, for each computing resource type, the requirement for each guest domain on the host computing device. In some embodiments, each guest domain/computing instance has an associated amount of processing (e.g., a number of vCPUs), memory (e.g., in terms of megabytes, gigabytes, etc., of RAM), storage (e.g., in terms of megabytes, gigabytes, terabytes, etc., of non-volatile storage), networking (e.g., in terms of bandwidth), etc., that is available or reserved for the instance. The determination may be made by the hypervisor by consulting its records, or remote from the host by querying the host and/or consulting a data store (e.g., resource assignment database) of the hardware virtualization service. At block 315, the operations 300 include determining a maximum amount of each computing resource type needed for the compute instances—e.g., a largest amount of needed vCPUs, a largest amount of needed RAM, etc.

The operations 300 include, at block 320, determining a requirement for each of the multiple compute resource types for the "new" or candidate host domain. Block 320 may include actually launching a host domain using the new host domain machine image, analyzing metadata associated with the machine image, inferring the size(s) based on the resource needs for the current host domain or another known host domain (which may include adjusting the size(s) based on comparative changes in the host domain code), etc. In the case on on-host analysis, this information may be provided by the migration manager 112 or obtained itself, e.g., by testing or analyzing the machine image as described, and any of these techniques may be utilized when performed away from the host by the migration manager 112.

At decision block 325, the operations 300 include determining whether there is sufficient availability on the host computing device, for each computing resource type, for a sum of the required amount for the candidate host domain (for that computing resource type) and the maximum amount needed across the guest domains (for that computing resource type). If so, the feasibility is verified at block 330, as both the candidate host domain can be run and each guest domain can comfortably have a copy thereof run (due to at least all of its resource needs being met, which are necessarily less than or equal to the maximums across all dimensions).

If not, in some embodiments the operations 300 include determining, at block 335, whether sufficient resources can be "borrowed" from one or more existing guest instances. In some cases, a portion of resources may be reallocated from an existing instance, such as when a user associated with that instance has indicated that it is acceptable to do so in the case of an host domain update; in this case, if a sufficient amount of some resource type can be "borrowed" from one or more existing guest domains (for use by a new guest domain during the brief live migration process), the feasibility may again be confirmed at block 330; otherwise, the feasibility may be denied at block 340. In such a scenario, another patching technique may be utilized—e.g., the "fast flip" intra-host migration techniques disclosed herein with regard to FIG. 4, or an inter-host live migration to remove all guest domains to allow for patching.

Turning back to FIG. 2, with the feasibility verified, at circle (2) the migration manager 112 may send one or more commands to the server computing device 104A to cause the live migration and patching to be performed. For example, the migration manager 112 may send a machine image for a new host domain 108' or an identifier of a location from where resources for the new host domain 108' may be obtained, which the hypervisor 106 may use in ultimately launching the host domain 108'. Additionally, or alternatively, migration manager 112 may send a command to the hypervisor 106 instructing it to perform a patching (and thus, the intra-host live migration), though in other embodiments the migration manager 112 may itself send certain individual commands to the hypervisor 106 to control individual steps of the migration and patching, e.g., to migrate a particular guest domain, remove a particular non-needed guest domain or host domain, etc.

At circle (3), the hypervisor 106 may cause a new host domain 108' to be launched using the machine image, and at circle (4) being a live migration process for moving the guest domain 110A (that utilizes the old host domain 108 for access to the physical resources of the server computing device 104A) to a new guest domain 110A' that utilizes the new host domain 108' for access to the physical resources of the server computing device 104A. As described herein, this process may include copying the memory 210 of the source guest domain 110A for use by the new guest domain 110A' at circle (5A), pausing the source guest domain 110A (e.g., at a detected or predicted "quiet" point in time) at circle (5B), transferring a set of memory changes made between the initial copy and the current point in time (e.g., as indicated by a bitmap data structure tracking dirty memory pages) to the new guest domain 110A' at circle (5C), starting or unpausing the new guest domain 110A' at circle (5D), updating hypervisor state 212 so that the new guest domain 110A' can operate in the place of the source guest domain 110A (e.g., by updating network connection state 214 so that messaging associated with the connection are correctly passed to the new guest domain 110A') at circle (5E), etc. At some point in time, such as immediately or when it has been verified that the new guest domain 110A' is fully operational, the hypervisor 106 may terminate the source guest domain 110A at circle (5F).

In some embodiments, this process reflected by circles (4) and (5A)-(5F) can be performed for each existing guest domain (as indicated by circle (6)) that was using the original host domain 108, such that new versions of these guest domains are created that utilize the new host domain 108'. When all such guest domains have been migrated, the process may include the hypervisor 106 terminating the old host domain 108 at circle (7), and the updating and live migration process is effectively complete.

Notably, during this process two different host domains may be operational and need to co-exist. Thus, the hypervisor 106 is configured to multiplex resources across the host domains, using scheduling logic to ensure fairness to both the host domains, and further, to ensure fairness across the guest domains. Accordingly, in some embodiments the scheduler logic of the hypervisor 106 for accessing resources (e.g., I/O functionality, CPU) is set in a manner to account for this hierarchal fairness need, in that the numbers of types of guest domains utilizing the host domains may be different, and moreover, will change over time. In some embodiments, as the numbers of guest domains on a host are typically quite small (e.g., commonly less than one hundred) a scheduling mechanism is selected that is optimized for small numbers, such as a random selection scheme, a round-robin scheme, a hierarchical scheme (e.g., first host domain level, then guest domain level), a weighted scheme, etc.

Figure 4:
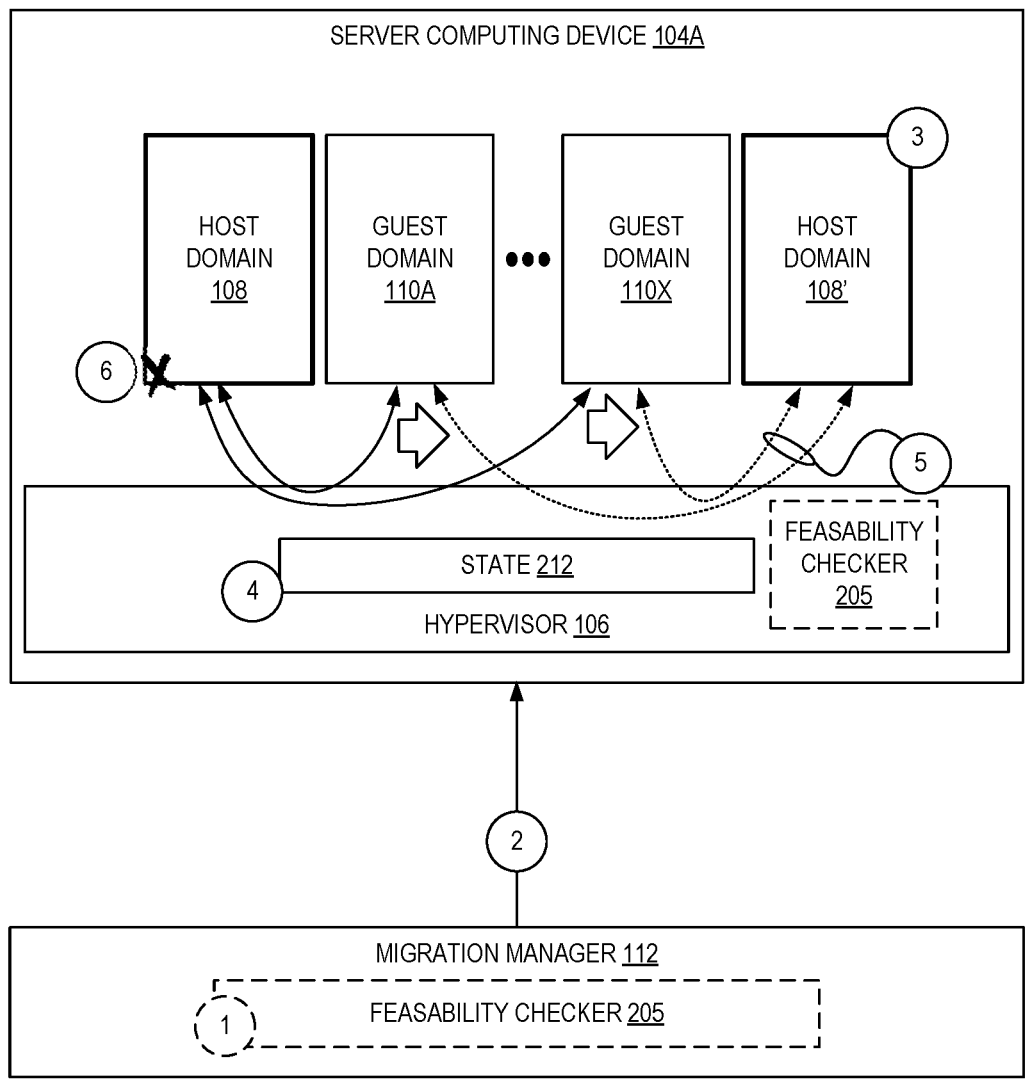
FIG. 4 is a diagram illustrating an environment for complete in-place migration of compute instances for efficient host domain patching according to some embodiments.

Another process for performing an update to a host domain is shown in FIG. 4, which is a diagram illustrating an environment for complete in-place migration of compute instances according to some embodiments. This depicted technique may be used to more readily move all guest domains to a new (e.g., patched or updated) host domain, though potentially at more risk as all guest domains are moved at once. In some embodiments, this technique may be used if the earlier step-by-step live migration is determined to not be feasible. As illustrated, at optional circle (1) a feasibility check may be performed and if it indicates that a step-by-step migration is not feasible, the migration manager 112 may send one or more commands at circle (2) indicating to the hypervisor 106 that it is to perform a complete in-place migration. Thus, at circle (3) the hypervisor 106 may launch a new host domain 108' (similar to as described earlier) and at circle (4), update a number of different state 212 values (e.g., hundreds of fields or more) at once (or at approximately the same time) to cause all references made to the previous host domain 108 to instead reference the new host domain 108'. As a result, all connections between the guest domains 110A-110X and the previous host domain 108 are now redirected to be between the guest domains 110A-110X and the new host domain 108' as shown by circle (5), and thereafter the original host domain 108 may be terminated at circle (6).

Figure 5:
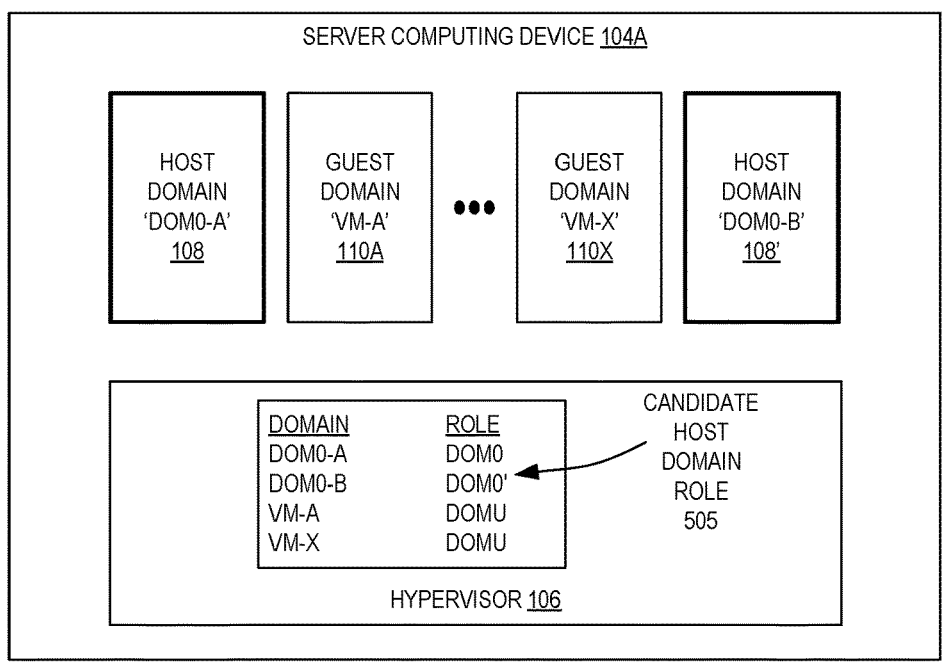
FIG. 5 is a diagram illustrating exemplary host domain execution role usage scenarios for in-place live migration of compute instances for efficient host domain patching according to some embodiments.
Figure 5:
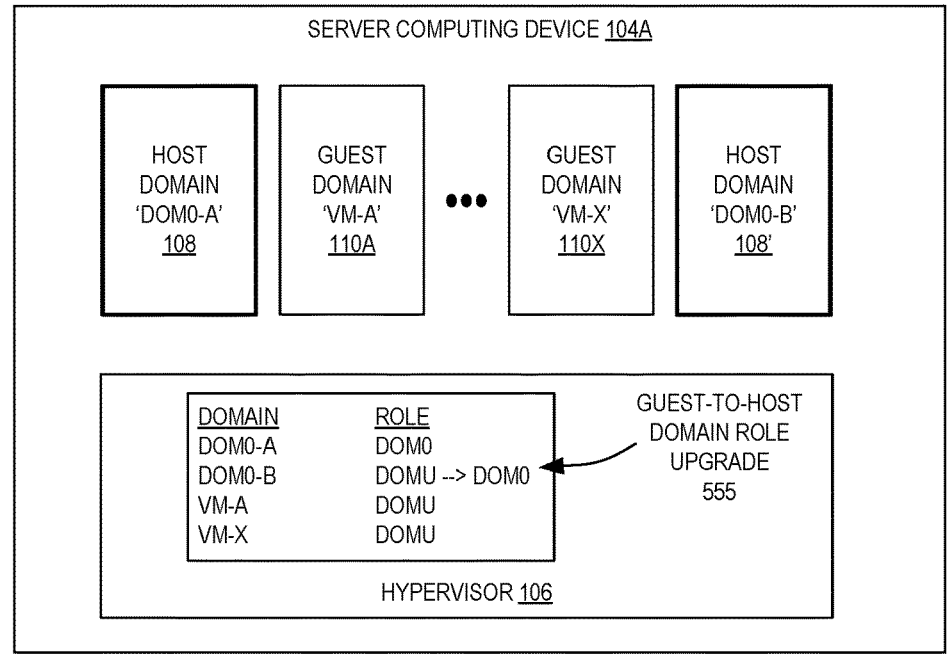

FIG. 5 is a diagram illustrating exemplary host domain execution role usage scenarios for in-place live migration of compute instances for efficient host domain patching according to some embodiments. As described herein, host domains execute in a different role than guest domains and thus have substantially different privileges and permissions to perform actions. For example, a host domain may be able to have connectivity to storage, edit ring buffers for a virtual link, have connectivity to single root input/output virtualization (SR-IOV) devices, etc., while guest domains are unable to do so. Accordingly, typically a hypervisor 106 allows a single host domain (e.g., "dom0-A" as shown at 500) to operate under the host domain role (having host domain associated permissions) and thus, in some embodiments, to launch a second host domain "dom0-B" for the purposes of live migration the hypervisor 106 may be modified to launch the host domain 108' under a new domain role/state—here, a "candidate" host domain role (shown as dom0') can be implemented for the hypervisor 106 to grant host domain-type privileges to a new host domain 108'. Alternatively, as shown by 550, the new host domain 108' can be initially launched with guest domain privileges (e.g., under a guest domain role, reflected as being a "domU" role) and later, its privileges can be updated at 555 by the hypervisor 106 such that it has privileges matching (or substantially matching) that of the original host domain 108, which may or may not include changing its tracked role to that of a host domain (shown by role "dom0").

Figure 6:
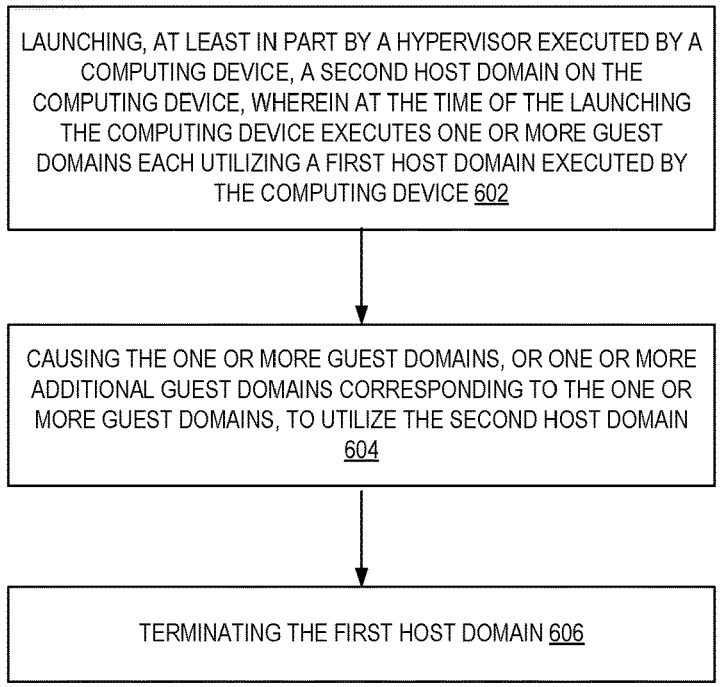
FIG. 6 is a flow diagram illustrating operations of a method for in-place live migration of compute instances for efficient host domain patching according to some embodiments.

FIG. 6 is a flow diagram illustrating operations of a method for in-place live migration of compute instances for efficient host domain patching according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the migration manager 112 and/or the hypervisor 106 of the other figures.

The operations 600 include, at block 602, launching, by a hypervisor executed by a computing device, a second host domain on the computing device, wherein at the time of the launching the computing device executes one or more guest domains each utilizing a first host domain executed by the computing device.

The operations 600 further include, in some embodiments, determining, prior to the launching of the second host domain, that a sufficient resource capacity associated with the computing device exists allowing for a migration of the one or more guest domains from the first host domain to the second host domain. In some embodiments, determining that the sufficient resource capacity exists comprises: determining, for each of one or more computing resource types, a largest required amount of the computing resource type required across the one or more guest domains; and determining, for each of the one or more computing resource types, an actual or predicted amount of the computing resource type associated with the second host domain In some embodiments, determining that the sufficient resource capacity exists further comprises: determining, for each of the one or more computing resource types, an amount of the computing resource type available at the computing device; and comparing, for each of the one or more computing resource types, the amount of the computing resource type that is available against a sum of the actual or predicted amount associated with the second host domain and the largest required amount across the one or more guest domains.

In some embodiments, launching the second host domain on the computing device comprises: causing the second host domain to be launched under a guest domain role; and upgrading the role of the second host domain from the guest domain role to a host domain role.

In some embodiments, launching the second host domain on the computing device comprises: causing the second host domain to be launched under a candidate host domain role, wherein the first host domain is executed in a host domain role and each of the one or more guest domains are executed in a guest domain role.

The operations 600 further include, at block 604, causing the one or more guest domains, or one or more additional guest domains corresponding to the one or more guest domains, to utilize the second host domain.

In some embodiments, causing the one or more guest domains, or one or more additional guest domains corresponding to the one or more guest domains, to utilize the second host domain comprises: causing a first additional guest domain, of the one or more additional guest domains, to be launched by the computing device using the second host domain; copying at least some of a memory space from a first guest domain, of the one or more guest domains, for the first additional guest domain; and terminating the first guest domain.

In some embodiments, upon the launching of the first additional guest domain, a network connection was active between a client and the first guest domain; and upon the terminating of the first guest domain, the same network connection was active between the client and the first additional guest domain.

In some embodiments, at a same point in time after the terminating of the first guest domain and prior to the terminating of first host domain, at least the first additional host domain uses the second host domain and at least another one of the one or more host domains uses the first host domain.

In some embodiments, copying at least some of the memory space from the first guest domain for the first additional guest domain comprises: copying all or substantially all of the memory space from the first guest domain for the first additional guest domain while the first guest domain remains operational; copying memory associated with a set of dirty pages of the memory space from the first guest domain for the first additional guest domain while the first guest domain is paused; and causing the first additional guest domain to be active at a conclusion of the copying of the set of dirty pages.

In some embodiments, causing the one or more guest domains, or the one or more additional guest domains corresponding to the one or more guest domains, to utilize the second host domain comprises: updating, by the hypervisor, domain state including at least network connection state associated with the one or more guest domains to reference the second host domain instead of the first host domain.

The operations 600 further include, at block 606, terminating the first host domain.

The operations 600 further include, in some embodiments, receiving a machine image at the computing device, wherein the machine image corresponds to an updated version of the first host domain, wherein the launching of the second host domain is based on use of the machine image.

Figure 7:
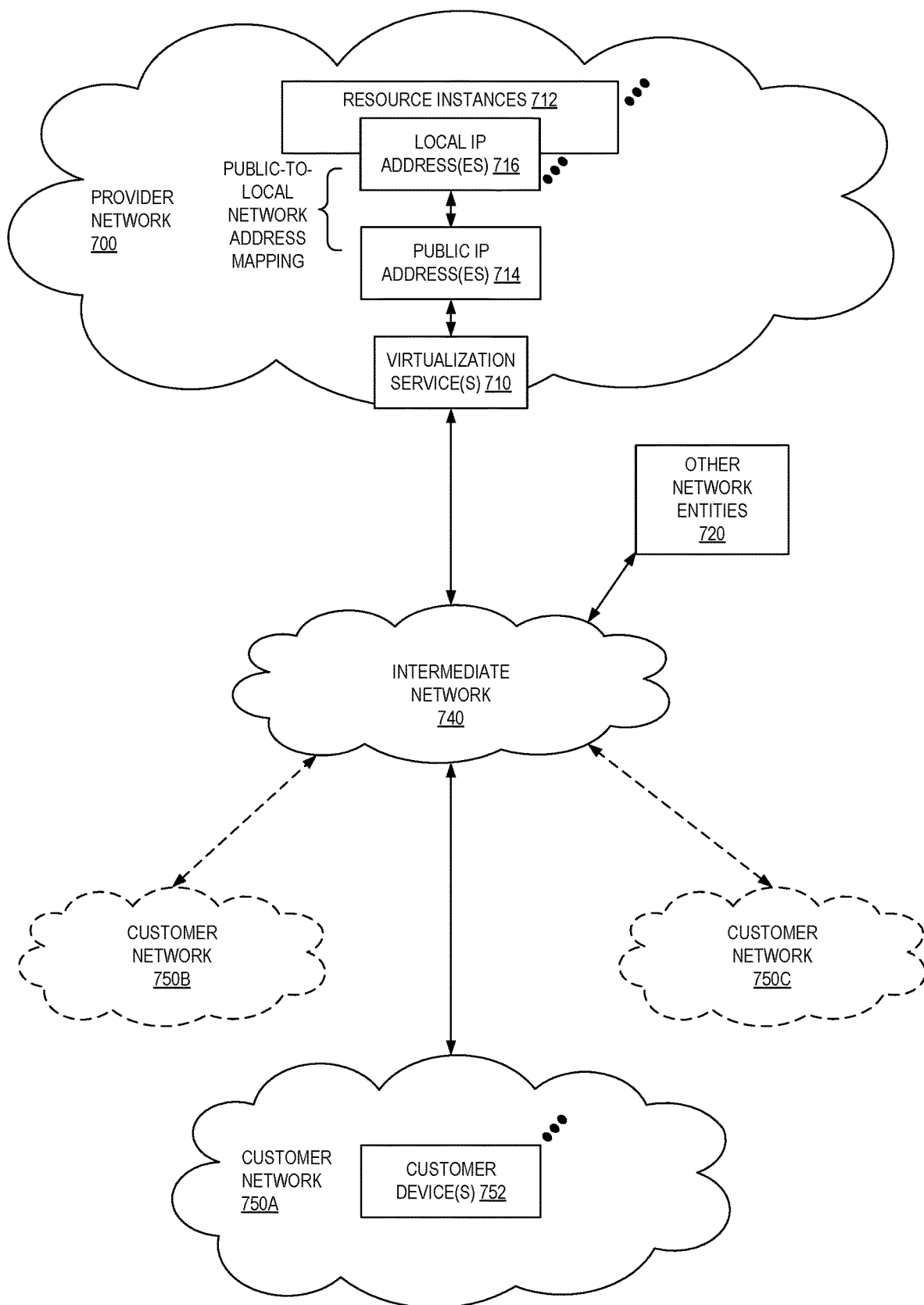
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
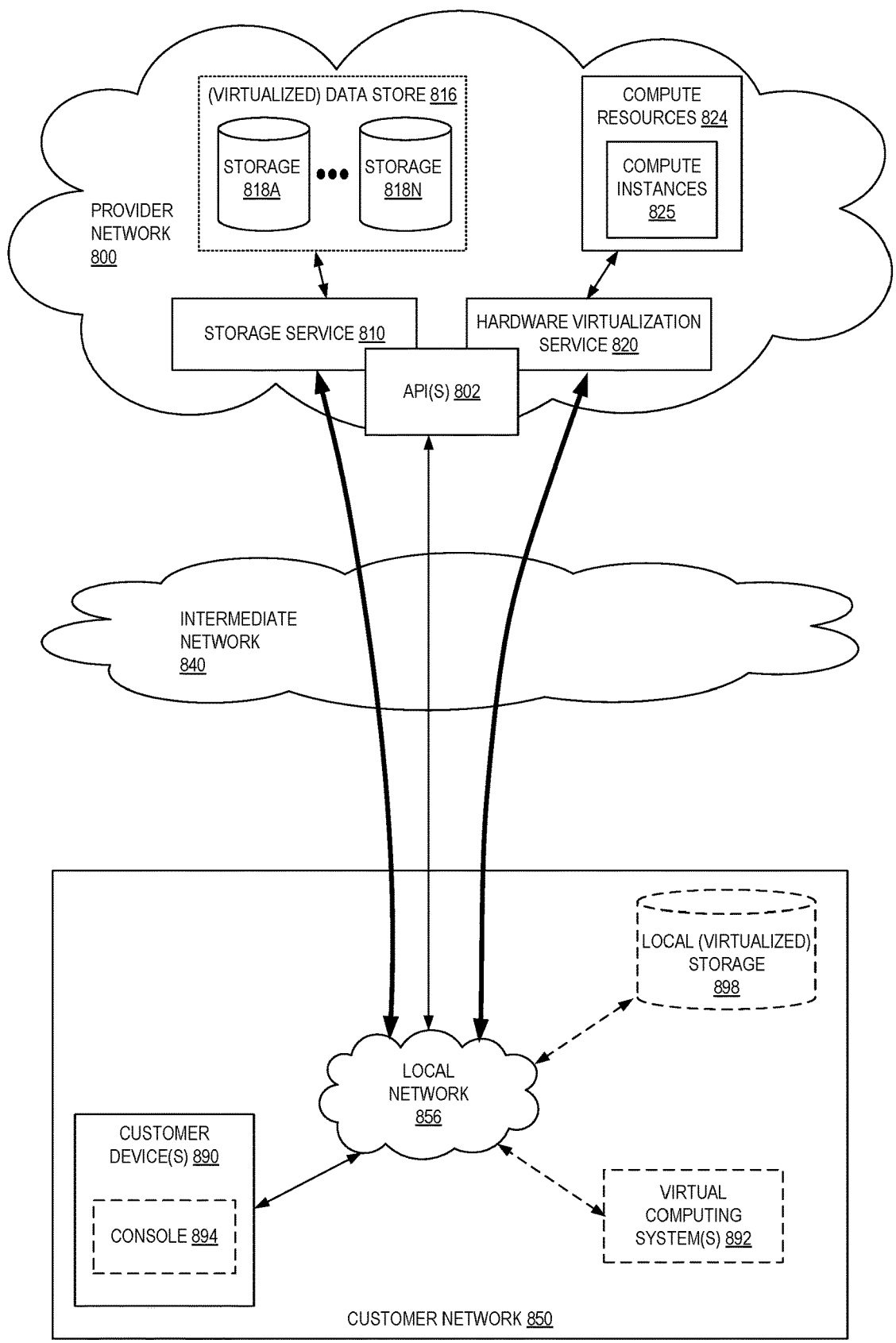
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple compute resources 824 (e.g., compute instances 825 such as VMs) to customers. The compute resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the compute resources 824 to public Internet destinations, and from public Internet sources to the local IP addresses of compute resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative Systems

Figure 9:
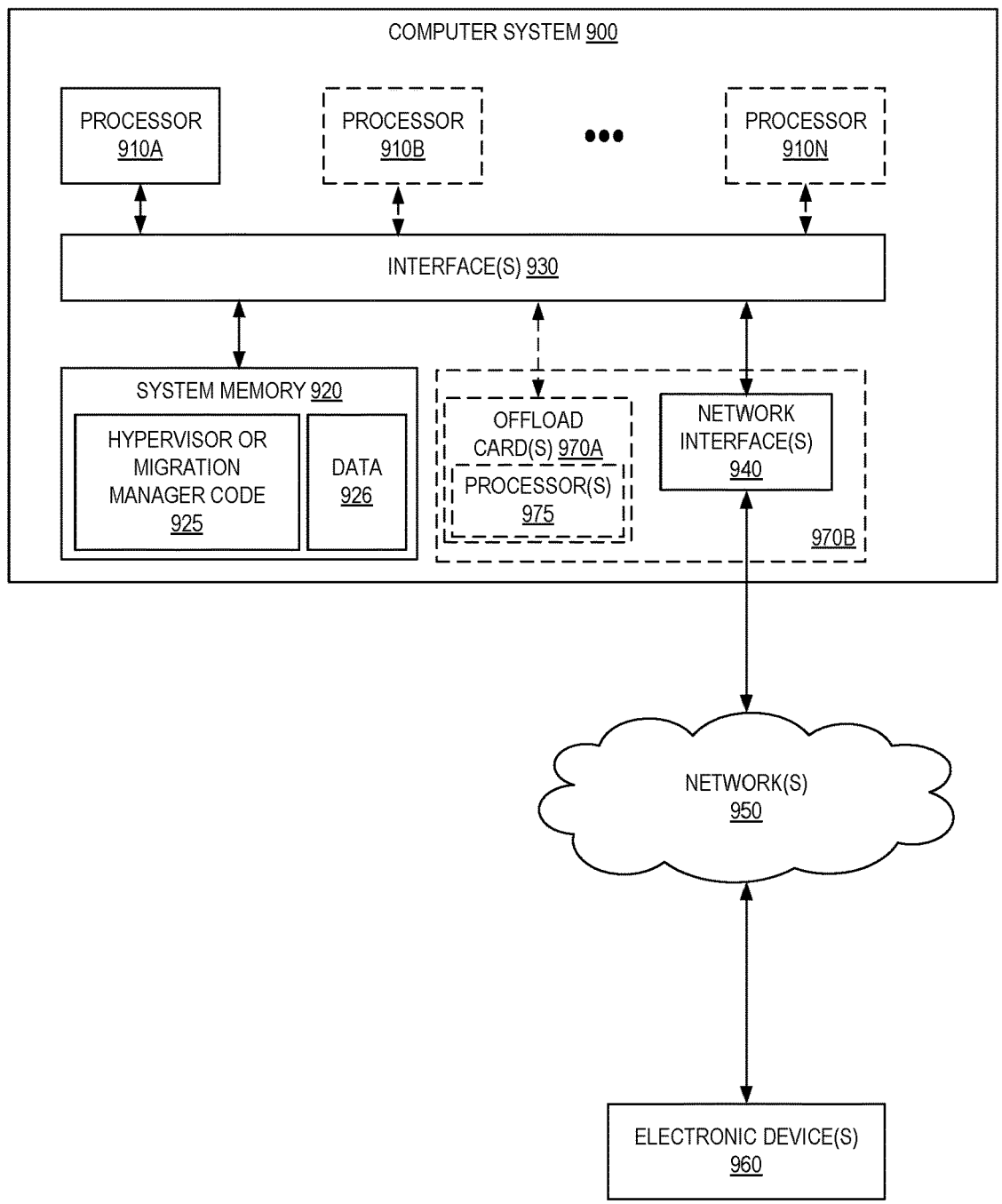
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as instance manger or migration manager code 925 (e.g., executable to implement, in whole or in part, the hypervisor 106 and/or migration manager 112) and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970A or 970B (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some embodiments the offload card(s) 970A or 970B can perform compute instance management operations such as pausing and/or un-pausing compute instances, launching and/or terminating compute instances, performing memory transfer/copying operations, etc. These management operations may, in some embodiments, be performed by the offload card(s) 970A or 970B in coordination with a hypervisor (e.g., upon a request from a hypervisor) that is executed by the other processors 910A-910N of the computer system 900. However, in some embodiments the virtualization manager implemented by the offload card(s) 970A or 970B can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   launching, by a hypervisor executed by a computing device, a second host domain on the computing device, wherein, at a time of the launching, the computing device executes one or more guest domains each utilizing a first host domain executed by the computing device, wherein the second host domain comprises an updated host domain;
   causing one or more new additional guest domains corresponding to the one or more guest domains to be launched at the computing device and to utilize the second host domain;
   copying data of a memory space at the computing device for a first quest domain, of the one or more quest domains, to a memory space at the computing device for a first new additional quest domain, of the one or more new additional quest domains;
   terminating the first quest domain; and
   terminating the first host domain.

2. The computer-implemented method of claim 1, wherein determining that the sufficient resource capacity exists comprises determining that, for each of a plurality of computing resource types, an amount of the computing resource type that is currently available at the computing device is greater than or equal to a sum of a required amount of the computing resource type needed for the updated version of the host domain and a maximum amount of the computing resource type associated with any compute instance currently hosted on the computing device.

3. The computer-implemented method of claim 1, wherein:
upon the launching of the new additional compute instance, a network connection is active between a client and the compute instance; and
upon the terminating of the compute instance, the network connection is active between the client and the new additional compute instance.

4. A computer-implemented method comprising:
launching, by a hypervisor executed by a computing device, a second host domain on the computing device, wherein, at a time of the launching, the computing device executes one or more guest domains each utilizing a first host domain executed by the computing device;
causing one or more new additional guest domains corresponding to the one or more guest domains to be launched at the computing device and to utilize the second host domain; and
terminating the first host domain.

5. The computer-implemented method of claim 4, further comprising:
determining, prior to the launching of the second host domain, that a sufficient resource capacity associated with the computing device exists allowing for a migration of the one or more guest domains from the first host domain to the second host domain.

6. The computer-implemented method of claim 5, wherein determining that the sufficient resource capacity exists comprises:
determining, for each of one or more computing resource types, a largest required amount of the computing resource type required across the one or more guest domains; and
determining, for each of the one or more computing resource types, an actual or predicted amount of the computing resource type associated with the second host domain.

7. The computer-implemented method of claim 6, wherein determining that the sufficient resource capacity exists further comprises:
determining, for each of the one or more computing resource types, an amount of the computing resource type available at the computing device; and
comparing, for each of the one or more computing resource types, the amount of the computing resource type that is available against a sum of the actual or predicted amount associated with the second host domain and the largest required amount across the one or more guest domains.

8. The computer-implemented method of claim 4, wherein:
upon the launching of the new additional first guest domain, a network connection is active between a client and the first guest domain; and
upon the terminating of the first guest domain, the network connection is active between the client and the first new additional guest domain.

9. The computer-implemented method of claim 4, wherein at a same point in time after the terminating of the first guest domain and prior to the terminating of the first host domain, at least the first new additional guest domain uses the second host domain and at least another one of the one or more guest domains uses the first host domain.

10. The computer-implemented method of claim 4, wherein copying at least some of the memory space from the first guest domain for the first new additional guest domain comprises:
copying all or substantially all of the memory space from the first guest domain for the first new additional guest domain while the first guest domain remains operational;
copying memory associated with a set of dirty pages of the memory space from the first guest domain for the first new additional guest domain while the first guest domain is paused; and
causing the first new guest domain to be active at a conclusion of the copying of the set of dirty pages.

11. The computer-implemented method of claim 4, further comprising:
updating, by the hypervisor, domain state including at least network connection state associated with the one or more guest domains to reference the second host domain instead of the first host domain.

12. The computer-implemented method of claim 4, further comprising:
receiving a machine image at the computing device, wherein the machine image corresponds to an updated version of the first host domain,
wherein the launching of the second host domain is based on use of the machine image.

13. The computer-implemented method of claim 4, wherein launching the second host domain on the computing device comprises:
causing the second host domain to be launched under a guest domain role; and
upgrading the role of the second host domain from the guest domain role to a host domain role.

14. The computer-implemented method of claim 4, wherein launching the second host domain on the computing device comprises:
causing the second host domain to be launched under a candidate host domain role,
wherein the first host domain is executed in a host domain role and each of the one or more guest domains are executed in a guest domain role.

15. A system comprising:
at least a first electronic device of a hardware virtualization service to host compute instances in a multi-tenant provider network; and
a second one or more electronic devices of a control plane of the hardware virtualization service, the control plane including instructions that upon execution cause the control plane to:
determine a need to update a first host domain executed by the first electronic device to a new version, wherein the first electronic device executes one or more compute instances each utilizing the first host domain; and
cause the first electronic device to end use of the first host domain in favor of a second host domain, wherein the first electronic device is to:
launch the second host domain,
cause one or more new additional compute instances corresponding to the one or more compute instances to be launched at the first electronic device and to utilize the second host domain; and
terminate the first host domain.

16. The system of claim 15, wherein the first electronic device, to cause the one or more new additional compute instances corresponding to the one or more compute instances to utilize the second host domain, is to:

cause the second host domain to be launched under a guest domain role; and upgrade the role of the second host domain from the guest domain role to a host domain role.

17. The system of claim 15, wherein the first electronic device, to cause the one or more new additional compute instances corresponding to the one or more compute instances to utilize the second host domain, is to:

cause the second host domain to be launched under a candidate host domain role, wherein the first host domain is executed in a host domain role and each of the one or more compute instances are executed in a guest domain role.

18. The system of claim 15, wherein the first electronic device is to further:

copy data of a memory space at the first electronic device for a first compute instance, of the one or more compute instances, to a memory space at the first electronic device for a first new additional compute instance, of the one or more new additional compute instances; and terminate the first compute instance, leaving one or more other compute instances of the one or more compute instances still executing and utilizing the first host domain.

19. The system of claim 15, wherein the control plane further includes instructions that upon execution cause the control plane to:

determine, prior to the launch of the second host domain, that a sufficient resource capacity associated with the first electronic device exists allowing for a migration of the one or more compute instances from the first host domain to the second host domain.

* * * * *